United States Patent
Murray et al.

(10) Patent No.: US 8,196,871 B2
(45) Date of Patent: Jun. 12, 2012

(54) CONTROL OF SHOCKWAVE-BOUNDARYLAYER-INTERACTION USING MEMS PLASMA DEVICES

(75) Inventors: Robert Carl Murray, Rotterdam, NY (US); Anurag Gupta, Clifton Park, NY (US); Seyed Gholamali Saddoughi, Clifton Park, NY (US); Aspi Rustom Wadia, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 816 days.

(21) Appl. No.: 12/315,172

(22) Filed: Nov. 26, 2008

(65) Prior Publication Data

US 2010/0129203 A1   May 27, 2010

(51) Int. Cl.
  *B64C 13/00*  (2006.01)
  *B64C 21/00*  (2006.01)
  *F04D 27/02*  (2006.01)
(52) U.S. Cl. ............ 244/204; 244/99.2; 244/205; 415/1
(58) Field of Classification Search .............. 415/1, 119; 244/175, 204, 205, 99.2, 82, 3.12
See application file for complete search history.

(56) References Cited

U.S. PATENT DOCUMENTS

| | | | |
|---|---|---|---|
| 6,513,754 B1 | 2/2003 | Grove | 244/35 |
| 6,644,598 B2 | 11/2003 | Glezer et al. | 244/208 |
| 6,651,935 B2 | 11/2003 | Loth et al. | 244/198 |
| 7,066,431 B2 | 6/2006 | Scott et al. | 244/134 D |
| 7,380,756 B1 * | 6/2008 | Enloe et al. | 244/175 |
| 2007/0095987 A1 | 5/2007 | Glezer et al. | 244/200.1 |
| 2007/0241229 A1 | 10/2007 | Silkey et al. | 244/53 |
| 2008/0023589 A1 * | 1/2008 | Miles et al. | 244/205 |
| 2008/0061192 A1 | 3/2008 | Sullivan | 244/200 |
| 2010/0329838 A1 * | 12/2010 | Greenblatt | 415/1 |

FOREIGN PATENT DOCUMENTS

WO   WO 02/072421 A2   9/2002

OTHER PUBLICATIONS

Couldrick et al., Normal shock wave/turbulent boundary-layer interaction control using 'smart' piezoelectricactuators, 2005, The Aeronautical Journal, vol. 109, No. 11, pp. 577-583.*

Jichul Shin, Venkat Narayanaswamy, L.L. Raja and N. T. Clemens, *Development of plasma actuators for supersonic flow control applications*, pp. 1-7, Flowfield Imaging Laboratory: Supersonic flow control using plasma actuators.

Bernhard H. Anderson, Jon Tinapple and Lewis Surber, *Optimal Control of Shock Wave Turbulent Boundary Layer Interactions Using Micro-Array Actuation*, NASA/TM-2006-214373, AIAA-2006-3197, pp. 1-14, Dec. 2006.

Eric Moreau, *Airflow control by non-thermal plasma actuators*, pp. 605-635, Institute of Physics Publishing, Journal of Physics D: Applied Physics 40, 2007.

(Continued)

*Primary Examiner* — Thomas L Dickey
*Assistant Examiner* — Nikolay Yushin
(74) *Attorney, Agent, or Firm* — Penny A. Clarke

(57) ABSTRACT

A micro-electromechanical system (MEMS) dielectric barrier discharge (DBD) based aerodynamic actuator is configured to modify a shockwave boundary layer interaction and limit incident boundary layer growth caused by a reflected shockwave.

8 Claims, 2 Drawing Sheets

OTHER PUBLICATIONS

Daniel K. Van Ness II, Thomas C. Corke and Scott C. Morris, *Turbine Tip Clearance Flow Control Using Plasma Actuators*, 44$^{th}$ Aerospace Science Meeting and Exhibit, Reno, Nevada, pp. 1-11, Jan. 9-12, 2006.

Lennart Hultgren and David E. Ashpis, *Boundary-Layer Separation Control Under Low-Pressure-Turbine Conditions Using Glow-Discharge Plasma Actuators*, NASA/TM-2004-212913, pp. 349-354, NASA Glenn Research Center, Cleveland, OH, 2004.

Chiranjeev Kalra, Sohail H. Zaidi, Bruce J. Alderman and Richard B. Miles, *Magnetically Driven Surface Discharges for Shock-Wave Induced Boundary-Layer Separation Control*, American Institute of Aeronautics and Astronautics, 45$^{th}$ AIAA Aerospace Sciences Meeting and Exhibit, 8-11, Reno, Nevada, pp. 1-11, Jan. 2007.

Dennis M. Bushnell, *Shock Wave Drag Reduction*, Annu. Rev. Fluid Mech. 2004:36:81-96.

J. Reece Roth and Xin Dai, *Optimization of the Aerodynamic Plasma Actuator as an Electrohydrodynamic (EHD) Electrical Device*, 44$^{th}$ AIAA Aerospace Sciences Meeting and Exhibit, Reno, Nevada, AIAA 2006-1203, pp. 1-28, Jan. 2006.

David M. Borgeson, *Boundary Layer Control Using Micro-Electromechanical Systems (MEMS)*, Thesis, pp. 1-76, Mar. 2002.

\* cited by examiner

CONTROL OF SHOCKWAVE-BOUNDARYLAYER-INTERACTION USING MEMS PLASMA DEVICES

BACKGROUND

The invention relates generally to boundary layer growth through shockwave-boundary layer interaction, and more specifically to use of a micro-electromechanical system (MEMS) dielectric barrier discharge (DBD) based aerodynamic actuator to modify the boundary layer growth through a shockwave to mitigate flow losses.

When a shockwave reflects off a surface, the incident boundary layer sees an abrupt rise in pressure. This produces a correspondingly abrupt rise in boundary layer thickness, and often even causes the flow to separate. This is a significant factor in limiting the pressure that can be sustained across, for example, a turbomachinery stage. The ability to control and mitigate the losses associated with the shockwave-boundary layer interaction would advantageously enable higher stage pressure loading.

Boundary layer growth through a shockwave-boundary layer interaction is a well known fundamental problem that often limits the performance envelope of aeromechanical devices. Shockwave-boundary layer interaction on fan blades in certain engines, for example, contributes significantly to losses at high thrust levels.

Different techniques have been employed to modify the boundary layer interaction to control flow characteristics in the absence of a shockwave. Many of these well known techniques use passive methods and devices, while some others use piezo electric surface modifications for flow control. One known technique employs DBD devices to modify boundary layer interaction to control flow characteristics associated with an air induction system for an aircraft. Another known technique employs surface cavities to modify the boundary layer growth through a shockwave to mitigate flow losses.

In view of the foregoing, it would be advantageous to provide a self-contained aerodynamic actuator capable of modifying the boundary layer growth through a shockwave to mitigate flow losses, and that can be actuated at frequencies much higher than piezo electric surfaces, that is small enough to be incorporated into a thermal-barrier coating, that requires very little power to operate, that provides more versatility than passive techniques, and that can be incorporated into existing devices such as, without limitation, fan blades, turbine blades, compressor blades, and duct walls, with only minor modifications(s).

BRIEF DESCRIPTION

Briefly, in accordance with one embodiment of the invention, an aerodynamic actuator comprises a micro-electromechanical system (MEMS) dielectric barrier discharge (DBD) based device configured to modify a shockwave boundary layer interaction and limit incident boundary layer growth caused by a reflected shockwave.

According to another embodiment of the invention, a turbomachinery aerodynamic actuator comprises:
 a turbomachine; and
 a micro-electromechanical system (MEMS) dielectric barrier discharge (DBD) based device disposed internal to a portion of the turbomachine and configured to modify a shockwave boundary layer interaction and limit incident boundary layer growth caused by a reflected shockwave internal to the turbomachine.

DRAWINGS

These and other features, aspects, and advantages of the present invention will become better understood when the following detailed description is read with reference to the accompanying drawings in which like characters represent like parts throughout the drawings, wherein.

While the above-identified drawing figures set forth particular embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

The embodiments described herein with reference to the figures are directed to devices and methods for controlling boundary layer growth associated with shockwave-boundary layer interactions. The micro-electromechanical system (MEMS) dielectric barrier discharge (DBD) based aerodynamic actuator device embodiments described herein can advantageously modify the boundary layer growth through a shockwave to mitigate flow losses associated with, but not limited to, turbomachinery compressor stages and fans. The reduced shockwave boundary layer interaction according to one embodiment, can allow utilization of few compressor stages resulting in lighter and less costly engines and can further allow engines to spin faster, resulting in a more efficient turbine.

Figure 1:
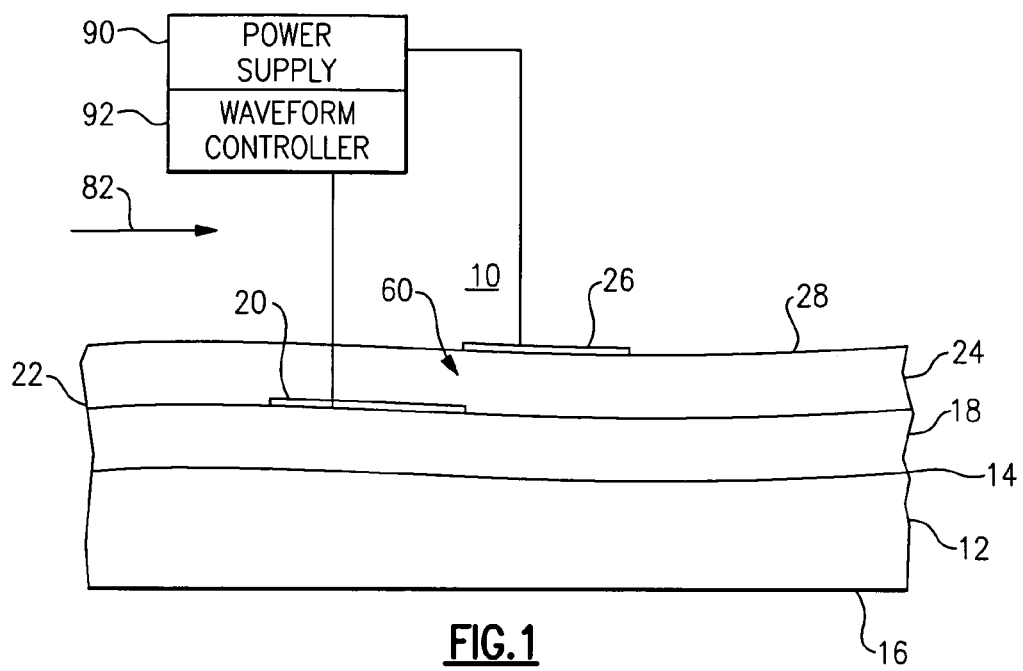
FIG. 1 illustrates a micro-electromechanical system (MEMS) dielectric barrier discharge (DBD) based aerodynamic actuator device according to one embodiment of the invention.

FIG. 1 illustrates a micro-electromechanical system (MEMS) dielectric barrier discharge (DBD) based aerodynamic actuator device 10 according to one embodiment of the invention. MEMS DBD based device 10 comprises a conductive substrate 12 having a top planar surface 14 and a bottom planar surface 16. A first dielectric layer 18 is deposited on the top planar surface 14 of the conductive substrate 12 using MEMS processing techniques, e.g. SiN, BN, SiC deposited via chemical vapor deposition, or plasma-enhance chemical vapor deposition (CVD-PCVD). A first thin conductive layer 20 is deposited on a top planar surface 22 of the first dielectric layer 18, opposite the top planar surface 14 of conductive substrate 12. A second dielectric layer 24 is deposited on the first dielectric layer top planar surface 22 to cover the first thin conductive layer 20. A second thin conductive layer 26 is then disposed on the top planar surface 28 of the second dielectric layer 24, opposite the top planar face 22 of the first dielectric layer.

Figure 2:
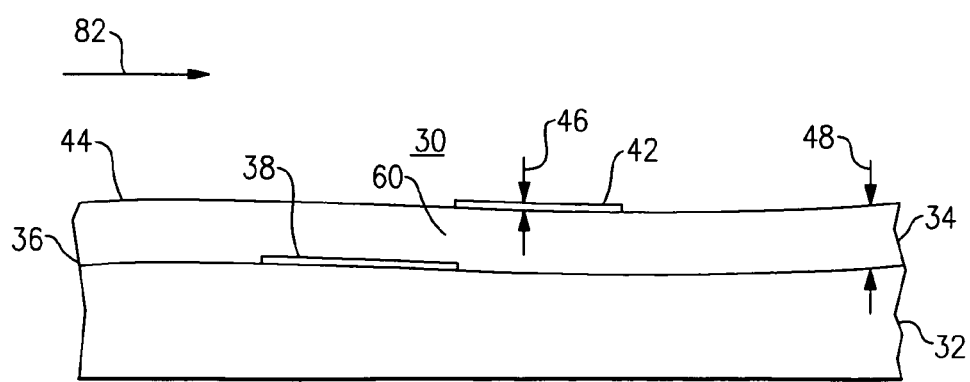
FIG. 2 illustrates a MEMS DBD based aerodynamic actuator device according to another embodiment of the invention.

FIG. 2 illustrates a MEMS DBD based aerodynamic actuator device 30 according to another embodiment of the invention. MEMS DBD device 30 is similar to device 10 described above with reference to FIG. 1 except that device 30 is formed using a nonconductive substrate 32 and a single dielectric layer 34. According to one embodiment, each thin conductive layer may have a thickness ranging between about 0.01 μm and about 1 μm in thickness; and dielectric layer 34 may have a thickness ranging between about 1 μm and about 100 μm.

MEMS DBD based device 30 according to one embodiment, comprises a nonconductive dielectric substrate 32 having a top planar surface 36 and a bottom planar surface 40. A first thin conductive layer 38 is deposited on the top planar surface 36 of the nonconductive dielectric substrate 32 using MEMS processing techniques, e.g. SiN, BN, SiC deposited via chemical vapor deposition, or plasma-enhance chemical vapor deposition (CVD-PCVD). A dielectric layer 34 is deposited on the top planar surface 36 to cover the first thin conductive layer 38. A second thin conductive layer 42 is then disposed on the top planar surface 44 of the dielectric layer 34, opposite the top planar surface 36 of the nonconductive dielectric substrate 32.

The present inventors recognized that aerodynamic actuators could be implemented as self-contained unitary devices in the form of MEMS DBD actuators having a small footprint form factor advantageous for use in controlling shockwave-boundary layer interaction to increase the performance envelope of aerodynamic devices including, without limitation, fan blades in engines. The resultant footprint of such actuators are beneficial in reducing engine losses at high thrust levels.

Because the MEMS DBD actuator embodiments described herein are self-contained unitary devices, they advantageously provide a higher level of reliability and consistency of performance than known DBD actuator devices that are implemented as separate component parts to accommodate a particular application. Further, since the DBD actuator embodiments described herein are MEMS devices, they can be incorporated into a thermal-barrier coating. These MEMS DBD actuator devices require very little power to operate and can be actuated at electronic frequencies much high than that associated with piezo electric surfaces.

Figure 3:
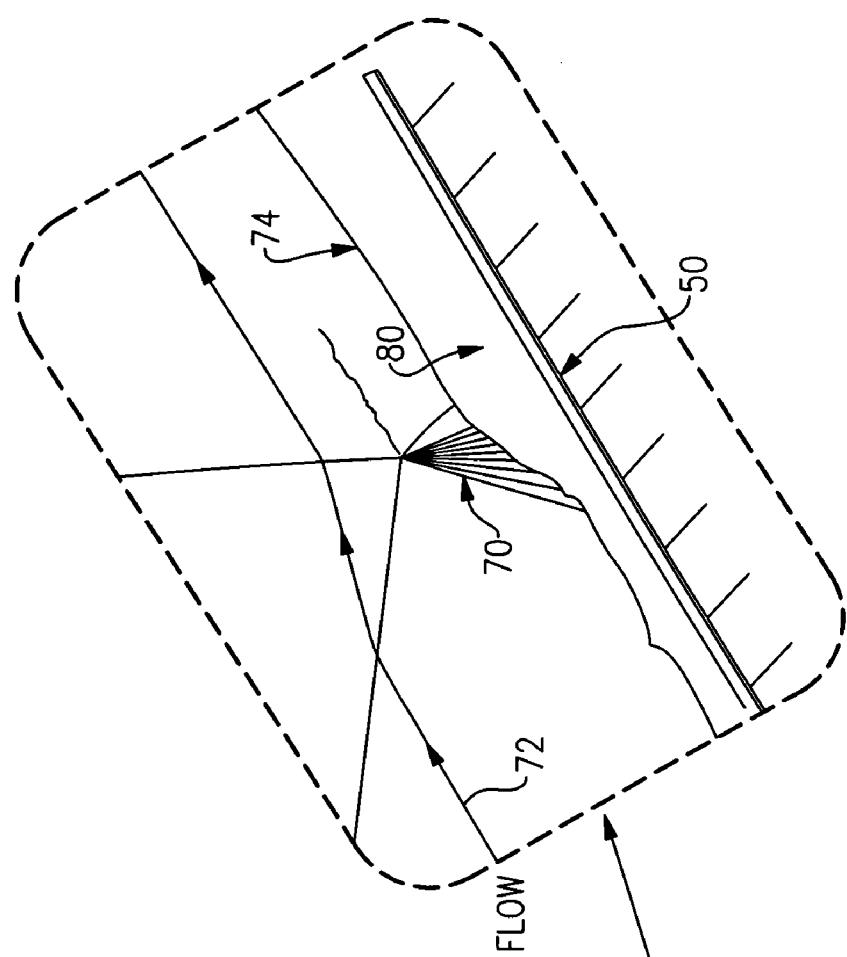
FIG. 3 illustrates a MEMS DBD based aerodynamic actuator device embedded into one portion of a turbomachinery fan according to one embodiment of the invention.
Figure 3:
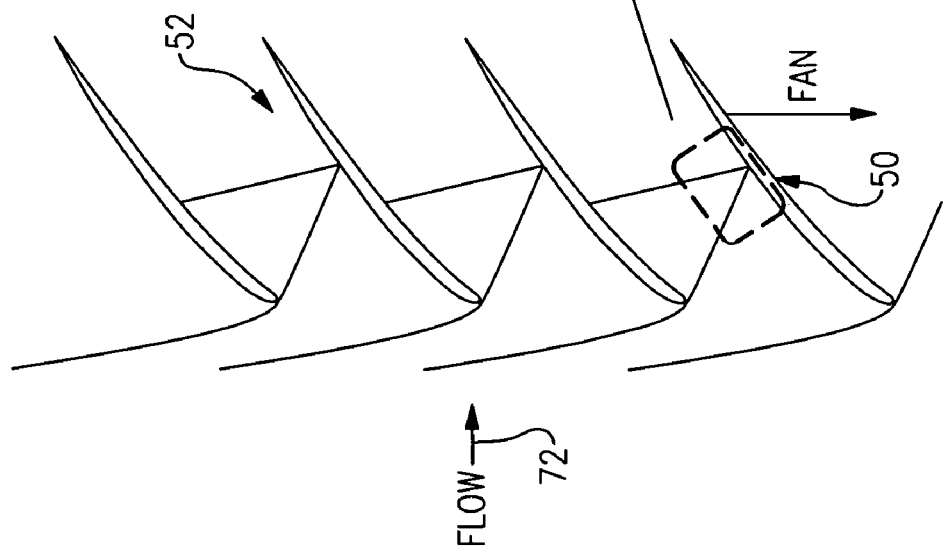

FIG. 3 illustrates a MEMS DBD based aerodynamic actuator device 50 embedded into one portion of a turbomachinery fan 52 according to one embodiment of the invention. Actuator device 50 may be implemented according to one of the embodiments 10, 30 described above with reference respectively to FIGS. 1 and 2. Thin conductive layer pairs 20, 26 or 38, 42 are each configured as parallel, offset electrodes separated respectively by a dielectric layer 24, 34 such that one conductive layer is exposed to air while the other conductive layer is covered by the corresponding dielectric layer 24, 34. The configuration of a self-contained MEMS DBD aerodynamic actuator device may be modified to accommodate a particular application.

Each conductive layer pair 20, 26 or 38, 42 may be connected to a power source 90 including a waveform controller 92 such as shown in FIG. 1 that is configured to control an input voltage level and pulsing, variable or AC voltage frequency, duty cycle and shape, such that air located near a gap enumerated 60 in FIGS. 1 and 2 between the conductive layers 20, 26 or 38, 42 is ionized in a desired fashion to create a region 70 of discharge plasma. The MEMS DBD aerodynamic actuator device 50 exerts a force upon the ionized particles capable of changing the path of motion of the particles against other forces, such as inertia, which tends to maintain the particles in their normal path. Air flow is thus energized with increased momentum in a near-surface region 80 such that flow separation can be delayed or prevented. If the flow has, for example, been previously separated, it can be re-attached.

With continued reference to FIG. 3, an orientation of a MEMS DBD aerodynamic actuator device 50 is defined herein as the direction in which it imparts momentum, i.e. generally perpendicular to a length direction 82 such as depicted in FIGS. 1 and 2 for devices 10 and 30. The device 50 in one embodiment is oriented to impart momentum generally parallel with the direction of flow 72 and accelerate the boundary layer in the near-surface region 80, although momentum can be added in any direction parallel to the surface in which device 50 is embedded. The near-surface region 80 in turbomachinery fans may be subject to formation of a separation region that is induced by interaction with a shock wave in the plasma discharge region 70. Since device 50 is oriented to impart momentum generally parallel with the direction of flow 72 and accelerate the boundary layer in the near-surface region 80, the device 50 acts to maintain the integrity of the boundary layer in the near-surface region 80 during the presence of a shockwave in that region. Workable results have been achieved by adding momentum both parallel to the flow 72 stream-wise, and perpendicular to the flow 72 (span-wise) in a direction parallel to the surface in which device 50 is embedded or attached.

The embodiments described herein advantageously avoid the use of copper foil tape and other like components that may easily deteriorate, decouple or disintegrate in some applications such as turbomachinery applications that may require integrating one or more MEMS DBD aerodynamic actuator devices 10, 30, 50 with engine cylinders, fans, and so on. The avoidance of copper foil tape and other like components further provides a more consistent aerodynamic actuator device manufacturing process yielding superior repeatability results when compared with known DBD devices and systems. Suitable applications include, without limitation, fan blades, turbine blades, compressor blades and duct walls.

In summary explanation, unitary micro-electromechanical system (MEMS) dielectric barrier discharge (DBD) based aerodynamic actuator device embodiments described herein can advantageously modify the boundary layer growth through a shockwave to mitigate flow losses associated with, but not limited to, turbomachinery compressor stages and fans. The configuration of the unitary self-contained MEMS DBD aerodynamic actuator device embodiments described herein may be modified to accommodate particular applications that are unfriendly to known devices and systems in terms of reliability, repeatability, size, cost, manufacturability, adaptability, ease of application, and so on.

While only certain features of the invention have been illustrated and described herein, many modifications and changes will occur to those skilled in the art. It is therefore, to be understood that the appended claims are intended to cover all such modifications and changes as fall within the true spirit of the invention.

The invention claimed is:

1. A turbomachinery aerodynamic actuator comprising:
   a turbomachine; and
   a micro-electromechanical system (MEMS) dielectric barrier discharge (DBD) based device disposed internal to a portion of the turbomachine and configured to modify a shockwave boundary layer interaction and limit incident boundary layer growth caused by a reflected shockwave internal to the turbomachine, wherein the MEMS DBD based aerodynamic actuator is further disposed within a thermal barrier coating associated with the turbomachine.

2. The turbomachinery aerodynamic actuator according to claim 1, wherein the MEMS DBD based device is further configured to ionize air internal to the turbomachine to create a region of discharge plasma that exerts a force upon ionized particles in a shockwave region internal to the turbomachine such that flow separation in a corresponding shockwave boundary layer is delayed or prevented.

3. The turbomachinery aerodynamic actuator according to claim 1, wherein the turbomachine is an engine.

4. The turbomachinery aerodynamic actuator according to claim 1, wherein the thermal barrier coating comprises an engine fan thermal barrier coating, a turbomachine blade thermal barrier coating, or a compressor blade thermal barrier coating.

5. The turbomachinery aerodynamic actuator according to claim 1, wherein the MEMS DBD based device comprises:
    a nonconductive dielectric substrate comprising an upper surface, a lower surface and side portions;
    a first thin conducting layer disposed on the upper surface of the nonconductive dielectric substrate;
    a dielectric layer comprising an upper surface, a lower surface and side portions, the lower surface of the dielectric layer covering the first thin conducting layer and the upper surface of the nonconductive dielectric substrate; and
    a second thin conducting layer disposed on the upper surface of the dielectric layer.

6. The aerodynamic actuator according to claim 1, wherein the MEMS DBD based device comprises:
    a conductive substrate comprising an upper surface, a lower surface and side portions;
    a first dielectric layer comprising an upper surface, a lower surface and side portions, the lower surface of the dielectric layer covering the upper surface of the conductive substrate;
    a first thin conducting layer disposed on the upper surface of the first dielectric layer;
    a second dielectric layer covering the first thin conducting layer and the upper face of the first dielectric layer, the second dielectric layer comprising an upper surface, a lower surface and side portions; and
    a second thin conducting layer disposed on the upper face of the second dielectric layer.

7. The turbomachinery aerodynamic actuator according to claim 1, further comprising a power supply and a waveform controller configured to activate the MEMS DBD based aerodynamic actuator in a predetermined manner.

8. The turbomachinery aerodynamic actuator according to claim 7, wherein the power supply and waveform controller together are configured to control a voltage shape, amplitude, duty cycle and frequency applied to the MEMS DBD based aerodynamic actuator.

* * * * *